(12) United States Patent
Walker

(10) Patent No.: US 11,927,396 B2
(45) Date of Patent: Mar. 12, 2024

(54) SAFETY AUDITING SYSTEM

(71) Applicant: Simon Walker, Mooresville, NC (US)

(72) Inventor: Simon Walker, Mooresville, NC (US)

(73) Assignee: Flynn Burner Corporation, Mooresville, NC (US)

( * ) Notice: Subject to any disclaimer, the term of this patent is extended or adjusted under 35 U.S.C. 154(b) by 1217 days.

(21) Appl. No.: 16/568,563

(22) Filed: Sep. 12, 2019

(65) Prior Publication Data

US 2020/0080782 A1  Mar. 12, 2020

Related U.S. Application Data

(60) Provisional application No. 62/730,088, filed on Sep. 12, 2018.

(51) Int. Cl.
*F27D 21/00* (2006.01)
*A21B 7/00* (2006.01)
(Continued)

(52) U.S. Cl.
CPC .............. *F27D 21/00* (2013.01); *A21B 7/00* (2013.01); *F24C 3/12* (2013.01); *F24C 3/128* (2013.01);
(Continued)

(58) Field of Classification Search
CPC ......... A21B 7/00; F24C 3/128; G05B 19/042; G05B 2219/2643; A47J 27/004;
(Continued)

(56) References Cited

U.S. PATENT DOCUMENTS

| 5,378,874 A | 1/1995 | Holling et al. |
| 7,877,291 B2 | 1/2011 | Koether et al. |

(Continued)

FOREIGN PATENT DOCUMENTS

| EP | 0822472 | 2/1998 |
| EP | 2362149 | 8/2011 |

(Continued)

OTHER PUBLICATIONS

Bakewatch, A Div. of ECD, ECD's New BakeWATCH® M.O.L.E.® Profiler Simplifies Data Collecting Process, Apr. 19, 2019.
(Continued)

*Primary Examiner* — Phuong T Nguyen
(74) *Attorney, Agent, or Firm* — Amundsen Davis, LLC; Joseph S. Heino

(57) ABSTRACT

A safety auditor is designed to perform opening and closing of every safety switch that is used in an industrial bakery oven. Every pressure sensor can be tested for on and off states. The low gas pressure switch can be vented and the high gas pressure switch pressurized. All thermocouples associated with the high temperature circuits are tripped. Fans are started and stopped over a communications signal or via the hard-wired interface as required to generate the safety testing. Once the safety testing is complete, the results along with time, date, name of tester, pass or fail will be printed out via a small kiosk printer. This ticket can then be filed in an office. As the operation is easy to do and requires little effort, it is much more likely to be performed and therefore safer for the host bakery.

12 Claims, 2 Drawing Sheets

(51) Int. Cl.
*F24C 3/12* (2006.01)
*G05B 19/042* (2006.01)

(52) U.S. Cl.
CPC .... *G05B 19/042* (2013.01); *F27D 2021/0057* (2013.01); *F27D 2021/0071* (2013.01); *F27D 2021/0078* (2013.01); *G05B 2219/2643* (2013.01)

(58) Field of Classification Search
CPC ...... A47J 36/165; A47J 43/046; A47J 27/002; A47J 43/044; A47J 43/082; A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 2043/04463; A47J 31/60; A47J 36/321; A47J 37/105; A47J 43/04; A47J 43/0766; A47J 43/0772; A47J 43/0777; A47J 43/08; A47J 43/085

USPC ......... 99/324, 325, 326, 331, 337, 338, 342, 99/352, 357, 427, 523, 468, 486, 280, 99/356, 390, 494, 516
See application file for complete search history.

(56) References Cited

U.S. PATENT DOCUMENTS

| | | |
|---|---|---|
| 2006/0259471 A1 | 11/2006 | Droubie et al. |
| 2008/0032018 A1* | 2/2008 | Garniss ................ A47J 37/044 |
| | | 426/523 |
| 2009/0266807 A1 | 10/2009 | Valliappan |
| 2017/0205077 A1 | 7/2017 | Seo |

FOREIGN PATENT DOCUMENTS

| | | |
|---|---|---|
| JP | 2013 | 10/2013 |
| WO | 2017024224 | 2/2017 |

OTHER PUBLICATIONS

Bayon, Ricardo Mayo et al., a Wireless Portable High Temperature Data Monitor for Tunnel Ovens, 2014.

* cited by examiner

SAFETY AUDITING SYSTEM

This application claims the benefit and priority of U.S. Provisional Patent Application No. 62/730,088 filed Sep. 12, 2018.

FIELD OF THE INVENTION

The present invention relates generally to industrial ovens of the type that are used to cook commercial food products, such as direct gas fired ovens and the like. More specifically, the present invention relates to an safety auditing apparatus, or "safety auditor", that works in conjunction with new or existing direct gas fired ovens to provide enhanced diagnostic capabilities and reduce oven down time during oven testing that is mandated by applicable safety codes. It also specifically relates to baking systems of the type that are presently available but where the safety auditor is an integrated permanent part of the oven or, alternatively, is a transient part thereof. It also specifically relates to baking systems where the electronic circuitry of the safety auditor can be directly coupled to the electronic circuitry of the oven or where the circuitry of the safety auditor and the oven can communication via wireless connectivity, such as Bluetooth® short range radio linking.

BACKGROUND OF THE INVENTION

Direct gas fired ovens have long been used for baking any number of food products. One such oven is a direct gas fired tunnel oven. In view of the inherent dangers of using gas and electricity in the oven, the Occupational Safety and Health Administration ("OSHA") has mandated the following in § 1910.263(I)(9)(ii):

All safety devices on ovens shall be inspected at intervals of not less than twice a month by an especially appointed, properly instructed bakery employee, and not less than once a year by representatives of the oven manufacturers.

Normally to do this, a maintenance engineer has to manually start and stop fans used within the oven—each time checking that the pressure switch or auxiliary contact is both opening and closing. This normally does not happen. Normally, the maintenance engineer checks that, when the fan is running, the switch is on. This is a time consuming process. Further, and when it comes to the gas pressure switches also used with the oven, this requires further work, and/or disconnecting electrically the switches. Again, this likewise ends up being skipped.

Therefore, and in the experience of this inventor, there is need for an improved apparatus and system for providing enhanced diagnostic capabilities and to reduce oven down time.

SUMMARY OF THE INVENTION

The concept of the present invention is to provide an apparatus, or tool, that is configured to work alongside new or existing industrial ovens as a safety auditor device ("safety auditor" or "auditor"). The safety auditor device comprises electronic circuitry but does not control the electronic circuitry that is used in controlling the timing or sequencing of the normal baking process or conveyance of food product or food product pans passing through the oven. The unit is designed to fit on the side of an existing control panel, cut out into the door, or function as a standalone unit. As a standalone unit, the safety auditor can be physically, but temporarily, interfaced with the oven control panel. Once physically located in place, the safety auditor interfaces with the existing control system via a series of connectors. It is contemplated that one embodiment will be part of the oven install to set this up and wire correctly. A series of configuration dialogs will tailor the auditor to the exact number of fans and switches as defined by the particular oven or oven system. This will be a one off set up. If possible, this unit will have communication capabilities, namely, but not limited to, Ethernet I/P, for example. Alternatively, the auditor will be used as a portable apparatus that allows for interfacing with a number of oven configurations as desired or required by the oven user, and in accordance with the baked product output requirements for each such oven. Further, the electronic circuitry of the safety auditor and the electronic circuitry of the oven can be configured to communicate via wireless connectivity, such as Bluetooth® short range radio linking, the electronic circuitry of each being modified to provide such connectivity.

It is also to be understood that the electronic circuitry of the auditor and the oven (and its master control panel) each includes at least one processor, or programmable logic controller ("PLC"), that drives at least one computer program that is dedicated to the auditor and the oven, respectively, which processor generally includes any and all types of microprocessors, general purpose processors, gate arrays, array processors, application specific integrated circuits (ASICs) and digital signal processors. The electronic circuitry of the auditor and the oven further includes at least one user interface ("UI") which is effectively the "junction" between a user and the computer programs of the type mentioned here. The interface typically includes a set of commands or menus through which a user communicates with the program. Still further, the circuitry comprises memory, which generally includes any type of integrated circuit or storage device configured for storing digital data including without limitation ROM, PROM, EEPROM, DRAM, SDRAM, SRAM, flash memory, and the like. All of the foregoing circuitry, including the processors, the interfaces and the memory are of the type known to those skilled in the art.

More particularly, the safety auditor of the present invention is designed to perform electromechanical opening and closing of every safety switch that is used. Every pressure sensor is tested for "on" and "off" states. The low gas pressure switch is one such safety switch that will be vented and the high gas pressure switch pressurized. All thermocouples associated with the high temperature circuits will be tripped. Fans will be started and stopped over the communications or via the hard-wired interface as required to generate the test. Once the testing is complete, the results along with time, date, name of tester, pass or fail will be printed out via a small kiosk printer or saved in a database. This ticket can then be filed in an office as desired or required. As the operation is easy to do and requires little effort, it is much more likely to be performed and therefore safer to the user, which is typically a host commercial bakery.

The foregoing and other features of the safety auditor of the present invention will be apparent from the detailed description that follows.

DETAILED DESCRIPTION OF THE INVENTION

Figure 1:
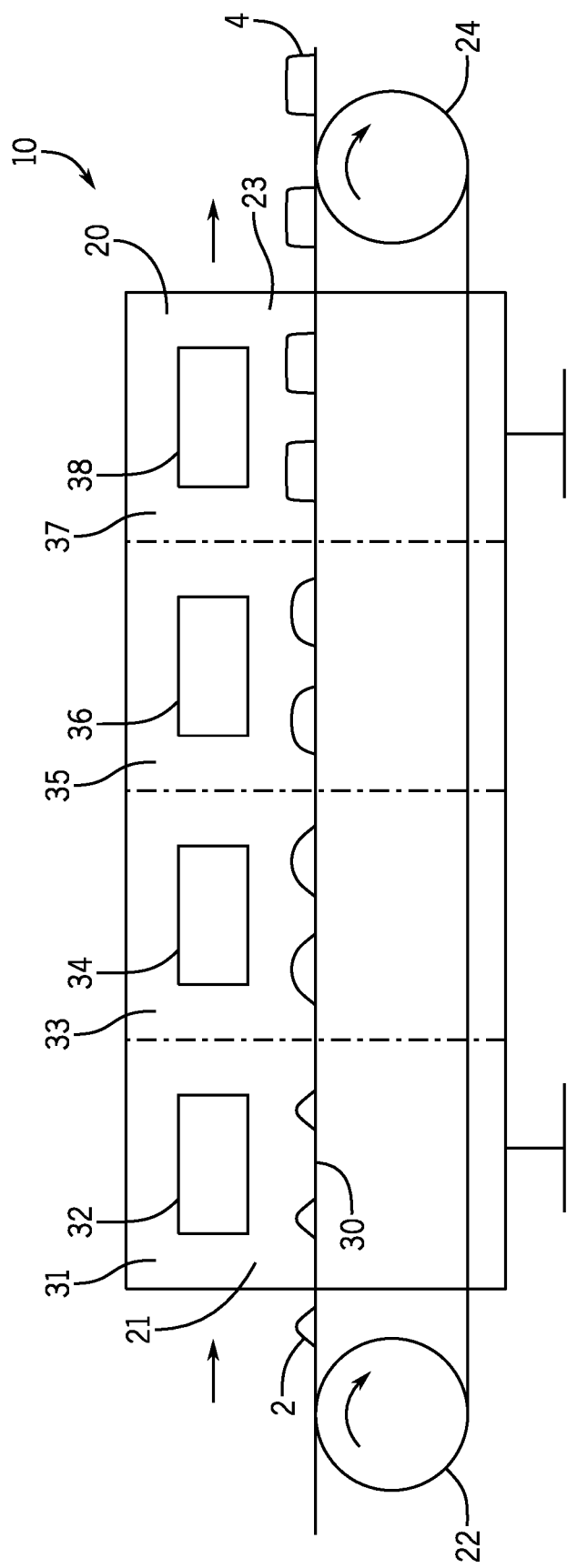
FIG. 1 is a first schematic view of a representative bakery oven shown with its essential features relative to the present invention.

Referring now to the drawings in detail, wherein like-numbered elements refer to like elements throughout, FIG. 1 illustrates a generic oven, generally identified 10. The oven 10 comprises a tunnel-type oven chamber 20 for baking food product 2, 4. The chamber 20 comprises a food product input end 21 and a food product output end 23. A continuous belt 30 moves food product 2 through different zones 31, 33, 35, 37 within the chamber 20, with each zone of the chamber 20 providing a different baking profile depending on the food product 2 to be cooked. The belt 30 is driven by rollers 22, 24 or like structure. Within each zone 31, 33, 35, 37 is a corresponding top and/or bottom heating and/or air flow devices 32, 34, 36, 38 (or "zone baking devices"). The zone baking devices are configured to produce the desired baking profile that is required within each zone. The zone baking devices are electrically and/or electromechanically actuated. As shown, four chambers are shown but the present invention is not so limited. In operation, the uncooked food product 2 enters the chamber 20 at the input end 21, is moved through each of the required zones and the cooked food product 4 exits the chamber 20 at the output end 23 for further processing and/or packaging. It is to be understood that operation of the oven 10 and its component parts is accomplished via conventional electronic circuitry (not shown) that comprises processors programmed in accordance with preprogrammed schemes, interfaces and memory elements of the type known to those skilled in the art.

Figure 2:
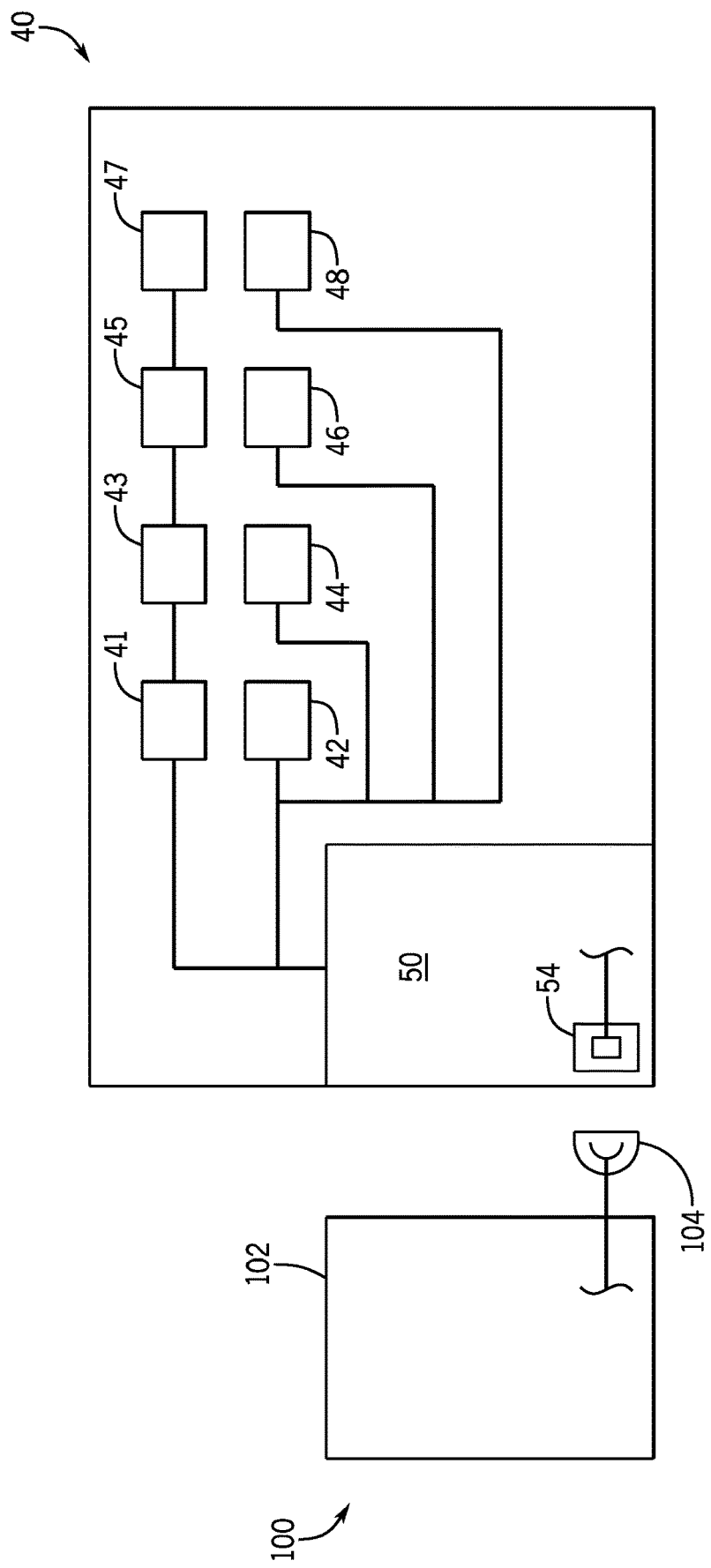
FIG. 2 is a second schematic view of the safety features for the bakery oven show in FIG. 1 and showing the essential features relative to the present invention.

As shown in FIG. 2, the oven 10 further comprises a safety device array, generally identified 40. The array 40 comprises a plurality of "zone safety devices" that may run in series 41, 43, 45, 47 with the zone baking devices 32, 34, 36, 38 or in parallel 42, 44, 46, 48 with them. All zone baking devices and zone safety devices are connected to a master control panel, generally identified 50, the panel 50 comprising a fixed panel female jack 52. A safety auditor, generally identified 100, in accordance with the present invention is provided with a housing 102 and a movable male plug 104 that is configured to be received by the female jack 52. In ovens 10 where the auditor 100 is built into the oven 10, that interface would instead comprise permanent connections between the master control panel 50 and the auditor 100.

As stated at the outset, OSHA mandates that "All safety devices on ovens shall be inspected at intervals of not less than twice a month by an especially appointed, properly instructed bakery employee, and not less than once a year by representatives of the oven manufacturers." Normally to do this, a maintenance engineer will have to manually start and stop fans each time checking that the pressure switch or auxiliary contact is both opening and closing. This manual step typically does not happen. The maintenance engineer also checks that, when the fan is running, the switch is on. This is time consuming activity and, when it comes to the gas pressure switches, this requires further work, and/or disconnecting electrically the switches, which often ends up being skipped. The safety auditor 100 is designed to perform opening and closing of every safety switch that is used. Every pressure sensor is tested for "on" and "off" states. The low gas pressure switch is vented and the high gas pressure switch pressurized. All thermocouples associated with the high temperature circuits are tripped. Fans are started and stopped over the communications or via the hard-wired interface as required to generate the test. Once the test is complete, the results along with time, date, name of tester, pass or fail will be printed out via a small kiosk printer. This ticket can then be filed in an office. As the operation is easy to do and requires little effort, it is much more likely to be performed, thereby making the oven 10 safer for users, which are typically a host bakery.

As alluded to previously, the safety auditor 100 can be configured in multiple configurations and customized to suit different types of ovens. It is tamper proof and possibly log unusual oven performance. Further, it is to be understood that operation of the safety auditor 100 and its diagnostic components is accomplished via conventional electronic circuitry (not shown) that comprises processors programmed in accordance with preprogrammed schemes, interfaces and memory elements of the type known to those skilled in the art.

Lastly, it is to be understood that the electronic circuitry (not shown) of the safety auditor 100 and the electronic circuitry (also not shown) of the oven 10 can be configured to communicate via wireless connectivity, such as Bluetooth® short range radio linking, the electronic circuitry of each being modified to provide such wireless connectivity.

In view of the foregoing, it will be apparent that the present invention provides a unique and novel solution for compliance testing and safety concerns related to direct gas fired ovens.

I claim:

1. A safety auditing system comprising:
an oven, the oven comprising:
an oven chamber;
an oven chamber inlet;
an oven chamber outlet; and
a plurality of oven chamber zones through which product passes from the inlet to the outlet;
at least one zone baking device within each one of the plurality of chamber zones, wherein:
all of the zone baking devices are electronically connected to a programmable master control panel, wherein the master control panel further comprises a user interface; and
each zone baking device is electronically or electromechanically actuated in accordance with a preprogrammed scheme by the master control panel;
an array of zone safety devices, wherein
each zone safety device in the array of zone safety devices is electronically connected to the master control panel; and
each zone safety device is electronically or electromechanically actuated by the master control panel;
a safety auditor connected to the zone safety devices via the master control panel for safety testing the zone baking devices via the zone safety devices, the safety auditor being programmable and having a user interface and further allowing a user to generate a safety test report via a printer.

2. The system of claim 1, wherein the safety auditor and master control panel connection comprises hard wiring of the safety auditor to the master control panel.

3. The system of claim 1, wherein
the master control panel is configured for wireless connectivity;

the safety auditor is configured for wireless connectivity; and the safety auditor and master control connection is wireless.

4. The system of claim 1, wherein the at least one zone baking device comprises a top or bottom heating device and/or an air flow device.

5. The system of claim 1, wherein the zone baking devices are configured to produce a desired baking profile within a corresponding oven chamber zone in accordance with a preprogrammed scheme by the master control panel.

6. The system of claim 1, wherein
each zone baking device further comprises
a plurality of gas pressure switches, wherein:
each gas pressure switch of the plurality of gas pressure switches includes a safety switch; and
the plurality of gas pressure switches is coupled to the master control panel such that the master control panel is able to selectively open or close each safety switch; and
a plurality of fans, wherein the plurality of fans is coupled to the master control panel such that the master control panel is able to selectively start or stop each fan.

7. The system of claim 6, further comprising low pressure gas switches and high pressure gas switches, wherein each low gas pressure switch can be vented and each high pressure gas switch pressurized.

8. The system of claim 6, further comprising thermocouples associated with high temperature circuits and such thermocouples can be tripped.

9. The system of claim 1, wherein the safety auditor is configured to the exact number of zone baking devices and zone safety devices included in a particular oven.

10. The system of claim 1, wherein the safety auditor is configured to interface with multiple oven configurations, together with the zone baking devices and the zone safety devices, all as required by the output requirements of each oven configuration.

11. The system of claim 1, wherein the safety auditor is configured to be tamper proof.

12. The system of claim 1, wherein the safety auditor is programmed to log unusual oven performance.

\* \* \* \* \*